(12) United States Patent
Wakisaka et al.

(10) Patent No.: US 11,867,555 B2
(45) Date of Patent: Jan. 9, 2024

(54) PHASE MEASUREMENT METHOD AND SIGNAL PROCESSING DEVICE

(71) Applicant: NIPPON TELEGRAPH AND TELEPHONE CORPORATION, Tokyo (JP)

(72) Inventors: Yoshifumi Wakisaka, Musashino (JP); Daisuke Iida, Musashino (JP); Kunihiro Toge, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 286 days.

(21) Appl. No.: 17/440,514

(22) PCT Filed: Mar. 19, 2020

(86) PCT No.: PCT/JP2020/012211
§ 371 (c)(1),
(2) Date: Sep. 17, 2021

(87) PCT Pub. No.: WO2020/203332
PCT Pub. Date: Oct. 8, 2020

(65) Prior Publication Data
US 2022/0155139 A1 May 19, 2022

(30) Foreign Application Priority Data

Apr. 3, 2019 (JP) ................................ 2019-071644

(51) Int. Cl.
*G01H 9/00* (2006.01)
*G01D 5/353* (2006.01)

(52) U.S. Cl.
CPC ......... *G01H 9/004* (2013.01); *G01D 5/35383* (2013.01)

(58) Field of Classification Search
CPC . G01H 9/004; G01D 5/35383; G01D 5/35358
See application file for complete search history.

(56) References Cited

U.S. PATENT DOCUMENTS

2022/0155139 A1\* 5/2022 Wakisaka ........... G01D 5/35358
2022/0221314 A1\* 7/2022 Wakisaka ........... G01D 5/35361

FOREIGN PATENT DOCUMENTS

| CN | 113646614 A | \* | 11/2021 | ......... G01D 5/35383 |
| CN | 114008433 A | \* | 2/2022 | ......... G01D 5/35361 |

(Continued)

OTHER PUBLICATIONS

Ali. Masoudi, T. P. Newson, "Contributed Review: Distributed optical fibre dynamic strain sensing", Review of Scientific Instruments, vol. 87, pp. 011501 (2016).

(Continued)

*Primary Examiner* — Daniel Pihulic
(74) *Attorney, Agent, or Firm* — Harness, Dickey & Pierce, P.L.C.

(57) ABSTRACT

It is intended to provide a phase measurement method and a signal processing device that are capable of reducing influence of noise of a measuring device without increasing the peak intensity of an incident light pulse when measuring the phase of scattered light in DAS-P.

A phase measurement method according to the present invention causes wavelength-multiplexed pulse light to be incident on a measurement target optical fiber, produces a scattered light vector obtained by plotting scattered light from the measurement target optical fiber for each wavelength onto a two-dimensional plane having the in-phase component thereof on the horizontal axis and the orthogonal component thereof on the vertical axis, rotates the produced scattered light vector for each wavelength at each place in the measurement target optical fiber to align the directions of the vectors, generates a new vector by calculating the (Continued)

arithmetic average of the vectors having the aligned directions, and calculates the phase by using the values of the in-phase and orthogonal components of the generated new vector.

4 Claims, 10 Drawing Sheets

(56) References Cited

FOREIGN PATENT DOCUMENTS

| | | | | | |
|---|---|---|---|---|---|
| CN | 114556058 | A | * | 5/2022 | ............. G01H 9/004 |
| EP | 3974798 | A1 | * | 3/2022 | ......... G01D 5/35361 |
| EP | 3951334 | A4 | * | 12/2022 | ......... G01D 5/35383 |
| JP | 2020169904 | A | * | 10/2020 | ......... G01D 5/35383 |
| JP | 7111045 | B2 | * | 8/2022 | ......... G01D 5/35383 |
| JP | 7173313 | B2 | * | 11/2022 | ......... G01D 5/35361 |
| WO | WO-2020203332 | A1 | * | 10/2020 | ......... G01D 5/35383 |
| WO | WO-2020234989 | A1 | * | 11/2020 | ......... G01D 5/35361 |

OTHER PUBLICATIONS

Ken'ichi Nishiguchi, Li Che-Hsien, Artur Guzik, Mitsunori Yokoyama, Kinzo Masuda, "Fiber-Optic Distributed Acoustic Sensor and Its Signal Processing", IEICE Tech. Rep, 115 (202), pp. 29-34 (2015), with computer generated English translation thereof.
G. Yang et al., "Long-Range Distributed Vibration Sensing Based on Phase Extraction from Phase-Sensitive OTDR", IEEE Photonics Journal, vol. 8, No. 3, 2016.

* cited by examiner

PHASE MEASUREMENT METHOD AND SIGNAL PROCESSING DEVICE

CROSS-REFERENCE TO RELATED APPLICATIONS

This application is a 371 U.S. National Phase of International Application No. PCT/JP2020/012211 filed on Mar. 19, 2020, which claims priority to Japanese Application No. 2019-071644 filed on Apr. 3, 2019. The entire disclosures of the above applications are incorporated herein by reference.

TECHNICAL FIELD

The present disclosure relates to a phase measurement method and a signal processing device that observe temporal change of the phase of scattered light generated at each place in a measurement target optical fiber.

BACKGROUND ART

A method called distributed acoustic sensing (DAS) that causes test pulse light to be incident on a measurement target optical fiber and detects backscattered light due to Rayleigh scattering has been known as a means measuring physical vibration applied to the optical fiber in a distributed manner in the longitudinal direction of the optical fiber (refer to Non Patent Literature 1, for example).

In DAS, change in the optical path length of the optical fiber due to physical vibration applied to the optical fiber is observed to sense the vibration. It is possible to detect object motion and the like around the measurement target optical fiber by detecting the vibration.

A method of measuring the intensity of scattered light from each place in the measurement target optical fiber and observing temporal change of the scattered light intensity is available as a method of detecting backscattered light in DAS and called DAS-intensity (DAS-I). DAS-I has a characteristic in simple device configuration but cannot quantitatively calculate change in the optical path length of the fiber due to vibration from the scattered light intensity, and thus is qualitative measurement method (refer to Non Patent Literature 2, for example).

However, DAS-phase (DAS-P) as a method that measures the phase of scattered light from each place in the measurement target optical fiber and observes temporal change of the phase has been researched and developed. The device configuration and signal processing of DAS-P are more complicate than those of DAS-I, but the phase linearly changes with change in the optical path length of the fiber due to vibration, and the rate of the change is identical at each place in the longitudinal direction of the optical fiber, and thus DAS-P can perform quantitative vibration measurement and has a characteristic that DAS-P can precisely reproduce the waveform of vibration applied to the measurement target optical fiber (refer to Non Patent Literature 2, for example).

In measurement by DAS-P, pulse light is incident on the measurement target optical fiber, and the phase of scattered light at time t at which the pulse light is incident is measured in a distributed manner the longitudinal direction of the optical fiber. Specifically, the phase θ(l, t) of the scattered light is measured where l represents a distance from an incident end of the optical fiber. As the pulse light is repeatedly incident on the measurement target optical fiber at a time interval T, temporal change θ(l, nT) of the phase of scattered light at time t=nT where n represents an integer is measured for each point in the longitudinal direction of the measurement target optical fiber. It is known that the magnitude of physical vibration applied in the interval from the distance l to a distance l+δl at each time nT is proportional to the difference δθ(l, nT) between the phase θ(l+δl, nT) at the distance l+δl and the phase θ(l, nT) at the distance l. Thus, an expression below is satisfied with a reference at time zero.

[Math. 1]

$$\text{(magnitude of vibration)} \propto \delta\theta(l, nT) - \qquad (1)$$
$$\delta\theta(l, 0) = [\theta(l+\delta l, nT) - \theta(l, nT)] - [\theta(l+\delta l, 0) - \theta(l, 0)]$$
$$(1) = [\theta(l+\delta l, nT) - \theta(l+\delta l, 0)] - [\theta(l, nT) - \theta(l, 0)]$$

Examples of a device configuration for detecting the phase of scattered light include a direct detection configuration in which backscattered light from the measurement target optical fiber is directly detected by a photodiode or the like, and a configuration using coherent detection in which the backscattered light is detected in combination with separately prepared reference light (refer to Non Patent Literature 1, for example).

A mechanism that performs coherent detection and calculates the phase is further classified into a mechanism that performs software-based processing by using Hilbert transformation and a mechanism that performs hardware-based processing by using 90-degree optical hybrid, but in both methods, an in-phase component I(l, nT) and an orthogonal component Q(l, nT) of scattered light are acquired, and the phase is calculated by an expression below.

[Math. 2]

$$\theta_{cal}(l, nT) = \text{Arctan}\left[\frac{Q(l, nT)}{I(l, nT)}\right] \qquad (2)$$

However, an output value from the fourth quadrant arc tangent operator "Arctan" is in a range $(-\pi, \pi]$ in radian, and $2m\pi+\theta(l, nT)$, where m is an arbitrary integer, are all the same vector direction on the xy plane, and thus uncertainty of $2m\pi$ exists in $\theta_{cal}(l, nT)$ calculated as described above.

Thus, signal processing such as phase unwrapping is further performed as a more accurate method of evaluating θ(l, nT). In typical phase unwrapping, when the phase after unwrapping is represented by

[Math. 2-1]

$$\theta_{cal}^{unwrap} \qquad (2-1)$$

an appropriate integer q is selected so that when

[Math. 2-2]

$$|\theta_{cal}(l,(p+1)T) - \theta_{cal}^{unwrap}(l,pT)| \qquad (2-2)$$

is larger than π radian where p represents an arbitrary integer,

[Math. 2-3]

$$|\theta_{cal}(l,(p+1)T) + 2\pi q - \theta_{cal}^{unwrap}(l,pT)| \qquad (2-3)$$

is equal to or smaller than π radian, and when the phase after unwrapping is represented by

[Math. 2-4]

$$\theta_{cal}^{unwrap}(l,(p+1)T) \qquad (2-4)$$

an expression below is calculated.

[Math. 3]

$$\theta_{cal}^{unwrap}(l,(p+1)T)=\theta_{cal}(l,(p+1)T)+2\pi q \quad (3)$$

is calculated. The upper index "unwrap" indicates the phase after unwrapping.

CITATION LIST

Patent Literature

Non-Patent Literature 1: Ali. Masoudi, T. P. Newson, "Contributed Review: Distributed optical fibre dynamic strain sensing." Review of Scientific Instruments, vol. 87, pp. 011501 (2016)

Non-Patent Literature 2: Ken'ichi Nishiguchi, Li Che-Hsien, Artur Guzik, Mitsunori Yokoyama, Kinzo Masuda, "Fiber-Optic Distributed Acoustic Sensor and Its Signal Processing", IEICE Tech. Rep, 115 (202), pp. 29-34 (2015)

Non-Patent Literature 3: G. Yang et al., "Long-Range Distributed Vibration Sensing Based on Phase Extraction from Phase-Sensitive OTDR", IEEE Photonics Journal, vol. 8, no. 3, 2016.

SUMMARY OF THE INVENTION

Technical Problem

In measurement by DAS, there are noises of a measuring device, such as heat noise of a PD for detecting light, noise at the subsequent electric stage, and shot noise due to light. Thus, influence of noises of the measuring device appears in the intensity and phase of scattered light to be measured as well.

In particular, when the influence of noises of the measuring device is large in measurement of the phase of scattered light, not only uncertainty of the phase increases, but also the probability of obtaining a measured value largely different from an ideal phase value when there are no noises increases.

For example, in a case of coherent detection, when the in-phase component is taken as the horizontal axis and the orthogonal component is taken as the vertical axis, the direction of the vector of measured scattered light when there is no noise corresponds to a phase to be measured, but when noise influence is large, the direction of the vector points in an opposite direction, and the probability that an actually measured phase value is different from an ideal phase value when there are no noises by n radian approximately is high. This leads to false recognition that large physical force is applied to an optical fiber when the magnitude of vibration is calculated from Expression (1). In addition, when noise influence is large, the number of points where the integer q is falsely selected in the unwrapping processing indicated by Expression (3) increases, and a phase value difference equal to or larger than $2\pi$, which does not exist in reality, occurs across a point of false selection. Such a phase value difference also leads to false recognition that large physical force is applied to the optical fiber when the magnitude of vibration is calculated from Expression (1).

To accurately measure the phase, the influence of noises of the measuring device needs to be reduced. The influence of noises of the measuring device is large when it can be regarded that noises of the measuring device are equivalent at each place and each time and when the intensity of scattered light decreases. Thus, the influence of noises of the measuring device can be reduced when the intensity of scattered light can be increased at each place and each time.

Factors of the decrease of the intensity of scattered light are not only losses due to absorption and scattering caused as pulse light propagates through the measurement target optical fiber as a probe. Since pulse light having a finite time width is incident on the measurement target optical fiber and scattering of the pulse light is detected, interference occurs with scattered light from a large number of scattering bodies extremely finely distributed in the measurement target optical fiber. As a result of the interference, the intensity of the scattered light decreases at places in accordance with distribution of the scattering bodies in the longitudinal direction of the measurement target optical fiber at each time. This phenomenon is called fading (refer to Non Patent Literature 3, for example).

Thus, when the phase of scattered light in DAS-P is to be measured, the occurrences of places where the intensity of the scattered light decreases at each time due to fading need to be prevented to reduce the influence of noises of the measuring device.

This problem can be solved by a method of simply increasing the peak intensity of incident light pulse. However, when the peak intensity is increased, a non-linear effect occurs, and characteristics of the pulse light change with propagation through the measurement target optical fiber. Thus, the peak intensity of a light pulse that can be incident is limited, and the above-described problem cannot be sufficiently solved in some cases.

Thus, the present invention is intended to solve the above-described problem by providing a phase measurement method and a signal processing device that are capable of reducing influence of noise of a measuring device without increasing the peak intensity of an incident light pulse when measuring the phase of scattered light in DAS-P.

Means for Solving the Problem

To achieve the above-described intention, a phase measurement method and a signal processing device according to the present invention causes wavelength-multiplexed pulse light to be incident on a measurement target optical fiber, produces a scattered light vector obtained by plotting scattered light from the measurement target optical fiber in each wavelength onto a two-dimensional plane having the in-phase component thereof as the horizontal axis and the orthogonal component thereof as the vertical axis, rotates the produced scattered light vector for each wavelength at each place in the measurement target optical fiber to align the directions of the vectors, generates a new vector by calculating the arithmetic average of the vectors having the aligned directions, and calculates the phase by using the values of the in-phase and orthogonal components of the generated new vector.

Specifically, a first phase measurement method according to the present invention includes: a measurement procedure of measuring an in-phase component and an orthogonal component of scattered light generated at a wavelength-multiplexed light pulse incident on a measurement target optical fiber; a vector acquisition procedure of acquiring, for each wavelength multiplexed in the light pulse, a two-dimensional vector constituted by the in-phase component and the orthogonal component of the scattered light measured through the measurement procedure at an arbitrary time and an arbitrary position in the measurement target optical fiber; a vector rotation procedure of rotating the two-dimensional vector acquired through the vector acquisition procedure for each wavelength at a reference time by a reference rotational amount for the wavelength so that the two-dimensional vector points in a reference direction and rotating the two-dimensional vector acquired through the vector acquisition procedure for each wavelength at another time different from the reference time by a reference rotational amount for the wavelength; and a calculation procedure of calculating a synthesis reference vector as an arithmetic average of the two-dimensional vector for each wavelength at the reference time, which is rotated through the vector rotation procedure, calculating a synthesis vector as an arithmetic average of the two-dimensional vector for each wavelength at the other time, which is rotated through the vector rotation procedure, and calculating a phase change amount of the scattered light based on an angle between the synthesis reference vector and the synthesis vector.

A first signal processing device according to the present invention includes: an input unit to which an in-phase component and an orthogonal component of scattered light generated at a wavelength-multiplexed light pulse incident on a measurement target optical fiber are input, the in-phase component and the orthogonal component being measured by a measuring device; a vector acquisition circuit configured to acquire, for each wavelength multiplexed in the light pulse, a two-dimensional vector constituted by the in-phase component and the orthogonal component of the scattered light input to the input unit at an arbitrary time and an arbitrary position in the measurement target optical fiber; a vector rotation circuit configured to rotate the two-dimensional vector acquired by the vector acquisition circuit for each wavelength at a reference time by a reference rotational amount for the wavelength so that the two-dimensional vector points in a reference direction and rotate the two-dimensional vector acquired by the vector acquisition circuit for each wavelength at another time different from the reference time by a reference rotational amount for the wavelength; and a calculation circuit configured to calculate a synthesis reference vector as an arithmetic average of the two-dimensional vector for each wavelength at the reference time, which is rotated by the vector rotation circuit, calculate a synthesis vector as an arithmetic average of the two-dimensional vector for each wavelength at the other time, which is rotated by the vector rotation circuit, and calculate a phase change amount of the scattered light based on an angle between the synthesis reference vector and the synthesis vector.

The first phase measurement method and the first signal processing device according to the present invention perform phase calculation by using a two-dimensional vector constituted by the in-phase component and the orthogonal component of scattered light due to incident light pulses of N different wavelengths. The phase measurement method and the signal processing device according to the present invention utilize that the rotational amount of the two-dimensional vector with time (in other words, vibration) is same irrespective of the wavelength. All two-dimensional vectors at a reference time are aligned in a reference direction (each two-dimensional vector is rotated by a reference rotational amount for the wavelength), and the arithmetic average thereof is calculated as a synthesis reference vector. Then, all two-dimensional vectors at another time are each rotated by a reference rotational amount for the wavelength, and the arithmetic average thereof is calculated as a synthesis vector. The amount of phase change of the scattered light occurred between the reference time and the other time is calculated based on the angle between the synthesis reference vector and the synthesis vector. In this manner, the arithmetic average of two-dimensional vectors of all wavelengths is used to reduce influence due to fading.

Thus, the present invention can provide a phase measurement method and a signal processing device that are capable of reducing influence of noise of a measuring device without increasing the peak intensity of an incident light pulse when measuring the phase of scattered light in DAS-P.

A second phase measurement method according to the present invention includes: a measurement procedure of measuring an in-phase component and an orthogonal component of scattered light generated at a wavelength-multiplexed light pulse incident on a measurement target optical fiber; a vector acquisition procedure of acquiring, for each wavelength multiplexed in the light pulse, a two-dimensional vector constituted by the in-phase component and the orthogonal component of the scattered light measured through the measurement procedure at an arbitrary time and an arbitrary position in the measurement target optical fiber; a first vector rotation procedure of rotating the two-dimensional vector acquired through the vector acquisition procedure for a reference wavelength at each time by a reference rotational amount for the time so that the two-dimensional vector points in a reference direction and rotating the two-dimensional vector acquired through the vector acquisition procedure for another wavelength different from the reference wavelength at each time by a reference rotational amount for the time; a first calculation procedure of calculating a first synthesis reference vector as an arithmetic average of the two-dimensional vector for the reference wavelength at each time, which is rotated through the first vector rotation procedure, calculating a first synthesis vector for each wavelength as an arithmetic average of the two-dimensional vector for the other wavelength at each time, which is rotated through the first vector rotation procedure, and calculating a reference rotational amount for each wavelength based on an angle between the first synthesis reference vector and the first synthesis vector; a second vector rotation procedure of rotating the two-dimensional vector acquired through the vector acquisition procedure for each wavelength at a reference time by the reference rotational amount for the wavelength, which is calculated through the first calculation procedure and rotating the two-dimensional vector acquired through the vector acquisition procedure for each wavelength at another time different from the reference time by the reference rotational amount for the wavelength, which is calculated through the first calculation procedure; and a second calculation procedure of calculating a second synthesis reference vector as an arithmetic average of the two-dimensional vector for each wavelength at the reference time, which is rotated through the second vector rotation procedure, calculating a second synthesis vector as an arithmetic average of the two-dimensional vector for each wavelength at the other time, which is rotated through the second vector rotation procedure, and calculating a phase change amount of the scattered light based on an angle between the second synthesis reference vector and the second synthesis vector.

A second signal processing device according to the present invention includes: an input unit to which an in-phase component and an orthogonal component of scattered light generated at a wavelength-multiplexed light pulse incident on a measurement target optical fiber are input, the in-phase component and the orthogonal component being measured by a measuring device; a vector acquisition circuit configured to acquire, for each wavelength multiplexed in the light pulse, a two-dimensional vector constituted by the in-phase component and the orthogonal component of the scattered light input to the input unit at an arbitrary time and an arbitrary position in the measurement target optical fiber; a first vector rotation circuit configured to rotate the two-dimensional vector acquired by the vector acquisition circuit for a reference wavelength at each time by a reference rotational amount for the time so that the two-dimensional vector points in a reference direction and rotate the two-dimensional vector acquired by the vector acquisition circuit for another wavelength different from the reference wavelength at each time by a reference rotational amount for the time; a first calculation circuit configured to calculate a first synthesis reference vector as an arithmetic average of the two-dimensional vector for the reference wavelength at each time, which is rotated by the first vector rotation circuit, calculate a first synthesis vector for each wavelength as an arithmetic average of the two-dimensional vector for the other wavelength at each time, which is rotated by the first vector rotation circuit, and calculate a reference rotational amount for each wavelength based on an angle between the first synthesis reference vector and the first synthesis vector; a second vector rotation circuit configured to rotate the two-dimensional vector acquired by the vector acquisition circuit for each wavelength at a reference time by the reference rotational amount for the wavelength, which is calculated by the first calculation circuit and rotate the two-dimensional vector acquired by the vector acquisition circuit for each wavelength at another time different from the reference time by the reference rotational amount for the wavelength, which is calculated by the first calculation circuit; and a second calculation circuit configured to calculate a second synthesis reference vector as an arithmetic average of the two-dimensional vector for each wavelength at the reference time, which is rotated by the second vector rotation circuit, calculate a second synthesis vector as an arithmetic average of the two-dimensional vector for each wavelength at the other time, which is rotated by the second vector rotation circuit, and calculate a phase change amount of the scattered light based on an angle between the second synthesis reference vector and the second synthesis vector.

The second phase measurement method and the second signal processing device according to the present invention first determine a rotation angle at each time so that a measurement vector for a reference wavelength at the time points a reference direction (for example, an I axis), and rotates a vector for another wavelength at each time by the rotation angle. Then, the angle of a time average vector obtained by calculating, for each wavelength, a time average of the rotated vector at each time is used as a vector rotation angle for the wavelength, which is described for the first phase measurement method and the first signal processing device. Influence of noises can be further reduced.

Effects of the Invention

The present invention can provide a phase measurement method and a signal processing device that are capable of reducing influence of noise of a measuring device without increasing the peak intensity of an incident light pulse when measuring the phase of scattered light in DAS-P.

DESCRIPTION OF EMBODIMENTS

Embodiments of the present invention will be described below with reference to the accompanying drawings. The embodiments described below are examples of the present invention, and the present invention is not limited to the embodiments below. Components having the same reference sign in the present specification and drawings are identical to each other.

Embodiment 1

Figure 1:
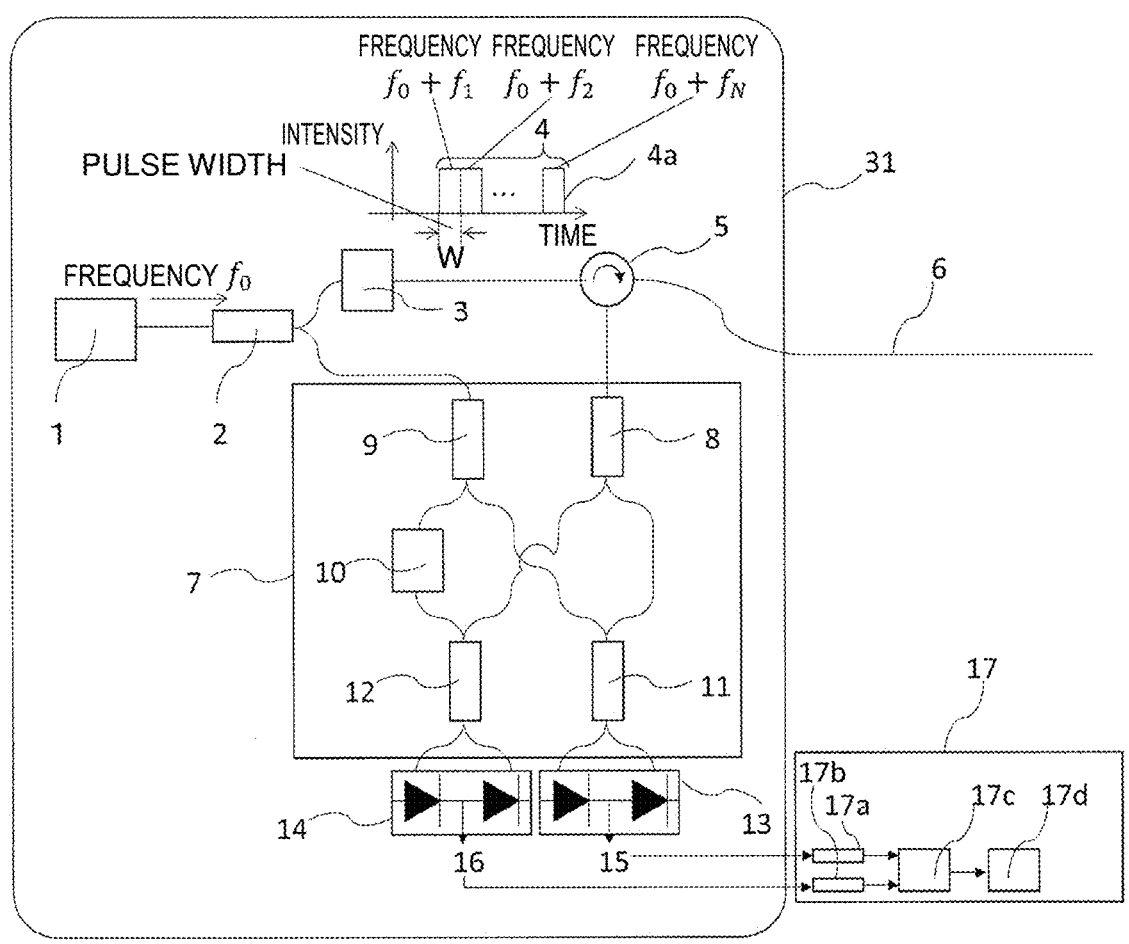
FIG. 1 is a diagram for description of a vibration detection device including a signal processing device according to the present invention.

FIG. 1 is a diagram for description of a vibration detection device of the present embodiment configured to perform vibration detection in DAS-P. The vibration detection device includes a measuring device 31 configured to perform coherent detection by using 90-degree optical hybrid in a reception system, and a signal processing device 17.

The measuring device 31 measures scattered light from a measurement target optical fiber 6 as follows. Continuous light having a frequency $f_0$ and a single wavelength is emitted from a CW light source 1 and bifurcated into reference light and probe light by a coupler 2. The probe light is shaped into a wavelength-multiplexed light pulse such as a light pulse 4 by a light modulator 3. The light pulse 4 has a configuration in which minute pulses $4a$ each having a frequency $f_0+f_1$ (i is an integer) and a pulse width set to a value W corresponding to the spatial resolution of measurement in the optical-fiber longitudinal direction are arranged for i=1, 2, . . . , N (N is an integer). The frequencies $f_1$ are selected to be sufficiently separated so that it can be regarded that the intensity of scattered light at each time and each place has no correlation between the values of i different from each other.

The kind of the light modulator 3 is not specifically specified as long as the light modulator 3 is capable of generating the light pulse 4, and the number thereof may be two or more. For example, an SSB modulator or a frequency-variable AO modulator may be used, and further intensity modulation by SOA or the like may be performed to increase the extinction ratio in pulsing.

The light pulse 4 is incident on the measurement target optical fiber 6 through a circulator 5. Light scattered at each point in an optical fiber 6 in the longitudinal direction returns to the circulator 5 as backscattered light and is incident on one input unit of a 90-degree optical hybrid 7. The reference light bifurcated by the coupler 2 is incident on the other input unit of the 90-degree optical hybrid 7.

The 90-degree optical hybrid 7 may have any internal configuration having a 90-degree optical hybrid function. An exemplary configuration thereof is illustrated in FIG. 1. The backscattered light is incident on a coupler 8 having a bifurcation ratio of 50:50, and two bifurcated rays of the scattered light are incident on an input unit of a coupler 12 having a bifurcation ratio of 50:50 and an input unit of a coupler 11 having a bifurcation ratio of 50:50. The reference light is incident on a coupler 9 having a bifurcation ratio of 50:50, and one of two bifurcated rays of the reference light is incident on the input unit of the coupler 11, whereas the other bifurcated ray is incident on the input unit of the coupler 12 with the phase shifted by $\pi/2$ at a phase shifter 10.

Two outputs from the coupler 11 are detected by a balance detector 13, and an electric signal 15 as an analog in-phase component $I^{analog}$ is output. Two outputs from the coupler 12 are detected by a balance detector 14, and an electric signal 16 as an analog orthogonal component $Q^{analog}$ is output.

The electric signal 15 and the electric signal 16 are transferred to the signal processing device 17 including an AD conversion function element 17a and an AD conversion function element 17b capable of performing sampling of a signal frequency band without aliasing. At the signal processing device 17, for a signal of an in-phase component $I^{digital}$ and an orthogonal component $Q^{digital}$ digitized and output from the AD conversion function element 17a and the AD conversion function element 17b, a signal of scattered light due to each pulse included in the light pulse 4 and having the frequency $f_0+f_i$ (i=1, 2, ..., N) is separated by a signal processing unit 17c.

Specifically, the signal processing unit 17c separates an in-phase component $I_i^{measure}$ and an orthogonal component $Q_i^{measure}$ obtained when a pulse of each frequency $f_0+f_i$ component is incident alone, by performing signal processing on $I^{digital}$ as superposition of in-phase components for all i and $Q^{digital}$ as superposition of orthogonal components for all i. Any specific signal processing method may be used as long as $I_i^{measure}$ and $Q_i^{measure}$ can be accurately separated from $I^{digital}$ and $Q^{digital}$. For example, a method that calculates $I_i^{measure}$ and $Q_i^{measure}$ by subjecting $I^{digital}$ and $Q^{digital}$ to a digital band-pass filter having a central frequency of $f_0+f_i$ and a passband of 2/W and ensuring phase delay is applicable.

In the method, an in-phase component and an orthogonal component as analog electric signals are digitized through AD conversion, and then separation into each frequency component is performed, but for example, an in-phase component and an orthogonal component as analog electric signals may be separated into each frequency component through an analog electric filter and then subjected to AD conversion.

Figure 2:
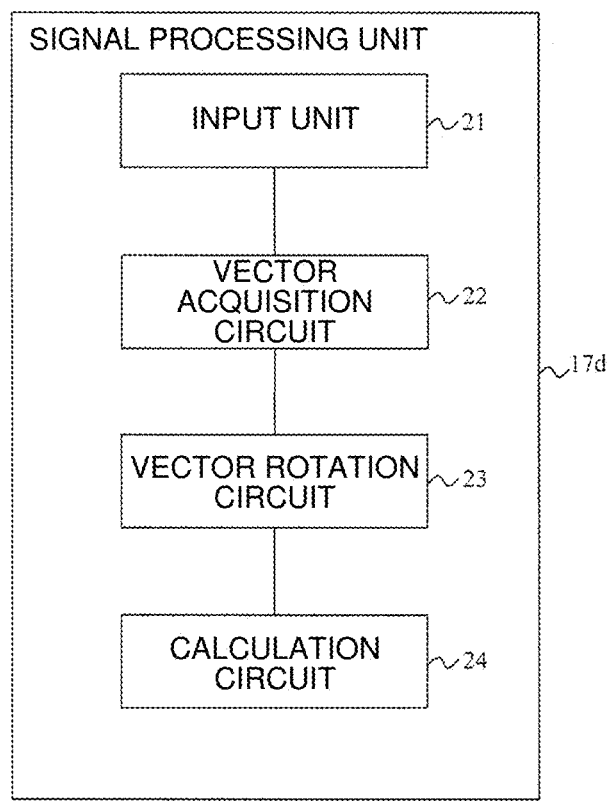
FIG. 2 is a diagram for description of the structure of the signal processing device according to the present invention.

Phase calculation is performed at a signal processing unit 17d based on $I_i^{measure}$ and $Q_i^{measure}$ acquired by the signal processing unit 17c. FIG. 2 is a diagram for description of the structure of the signal processing unit 17d. The signal processing unit 17d includes an input unit 21, a vector acquisition circuit 22, a vector rotation circuit 23, and a calculation circuit 24. An in-phase component and an orthogonal component of scattered light generated at the wavelength-multiplexed light pulse 4 incident on the measurement target optical fiber 6 are input to the input unit 21, the in-phase component and the orthogonal component being measured by the measuring device 31.

The vector acquisition circuit 22 acquires, for each wavelength multiplexed in the light pulse 4, a two-dimensional vector constituted by the in-phase component and the orthogonal component of the scattered light input to the input unit 21 at an arbitrary time and an arbitrary position in the measurement target optical fiber 6.

The vector rotation circuit 23 rotates the two-dimensional vector acquired by the vector acquisition circuit 22 for each wavelength at a reference time by a reference rotational amount for the wavelength so that the two-dimensional vector points in a reference direction. In addition, the vector rotation circuit 23 rotates the two-dimensional vector acquired by the vector acquisition circuit 22 for each wavelength at another time different from the reference time by a reference rotational amount for the wavelength.

The calculation circuit 24 calculates a synthesis reference vector as the arithmetic average of the two-dimensional vector for each wavelength at the reference time, which is rotated by the vector rotation circuit 23. In addition, the calculation circuit 24 calculates a synthesis vector as the arithmetic average of the two-dimensional vector for each wavelength at the other time, which is rotated by the vector rotation circuit 23. In addition, the calculation circuit 24 calculates a phase change amount of the scattered light based on an angle between the synthesis reference vector and the synthesis vector.

Figure 3:
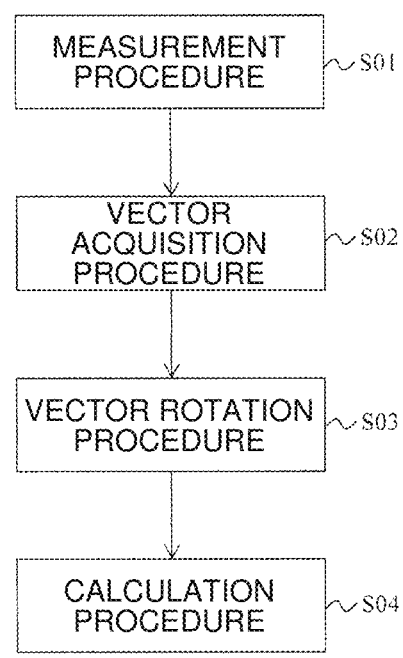
FIG. 3 is a diagram for description of a phase measurement method according to the present invention.

FIG. 3 is a diagram for description of a phase measurement method performed by the present vibration detection device. The phase measurement method includes four steps described below.

In a measurement procedure S01 as the first step, the in-phase component and the orthogonal component of scattered light generated at the wavelength-multiplexed light pulse 4 incident on the measurement target optical fiber 6 are measured.

In a vector acquisition procedure S02 as the second step, a two-dimensional vector constituted by the in-phase component and the orthogonal component of the scattered light measured through the measurement procedure S01 at an arbitrary time and an arbitrary position in the measurement target optical fiber 6 is acquired for each wavelength multiplexed in the light pulse 4.

In a vector rotation procedure S03 as the third step, the two-dimensional vector acquired through the vector acquisition procedure S02 for each wavelength at a reference time is rotated by a reference rotational amount for the wavelength so that the two-dimensional vector points in a reference direction. In addition, in the vector rotation procedure S03, the two-dimensional vector acquired through the vector acquisition procedure S02 for each wavelength at another time different from the reference time is rotated by a reference rotational amount for the wavelength.

In a calculation procedure S04 as the fourth step, a synthesis reference vector is calculated as the arithmetic average of the two-dimensional vector for each wavelength at the reference time, which is rotated through the vector rotation procedure S03. In addition, in the calculation procedure S04, a synthesis vector is calculated as the arithmetic average of the two-dimensional vector for each wavelength at the other time, which is rotated through the vector rotation procedure S03, and a phase change amount of the scattered light is calculated based on an angle between the synthesis reference vector and the synthesis vector.

The following first describes a method of calculating a phase by using the in-phase component $I_i^{measure}$ and the orthogonal component $Q_i^{measure}$ only at a single frequency, and then describes influence of fading at phase calculation.

$I_i^{measure}$ (l, nT) is a measured value in which noise is added to an in-phase component $I_i$(l, nT) when there is no noise, and $Q_i^{measure}$ (l, nT) is a measured value in which noise is added to an orthogonal component $Q_i$(l, nT) when there is no noise. Thus, when $N_I$ and $N_Q$ represent noises superimposed on the in-phase component and the orthogonal component, respectively, the measured values can be expressed by expressions below.

[Math. 4]

$$I_i^{measure}(l,nT)=I_i(l,nT)+N_I(l,nT) \quad (4)$$

[Math. 5]

$$Q_i^{measure}(l,nT)=Q_i(l,nT)+N_Q(l,nT) \quad (5)$$

The phase is calculated from the measured in-phase and orthogonal components by the signal processing device 17 as follows.

[Math. 6]

$$\theta_i^{cal}(l, nT) = \text{Arctan}\left[\frac{Q_i^{measure}(l, nT)}{I_i^{measure}(l, nT)}\right] = \text{Arctan}\left[\frac{Q_i(l, nT) + N_Q(l, nT)}{I_i(l, nT) + N_I(l, nT)}\right] \quad (6)$$

Since there are the noises $N_I$ and $N_Q$, uncertainty occurs to a position pointed by a vector (x, y)=($I_i^{measure}$(l, nT), $Q_i^{measure}$ (l, nT)) on an xy plane with the in-phase component as the x axis and the orthogonal component as the y axis, and uncertainty also occurs to the phase as a direction pointed by the vector. For example, when there are no noises, a phase calculated value $\theta_i^{cal}$(l, nT) does not temporally change for each l but is a constant value while no vibration is applied to the optical fiber. However, when there are noises, the phase calculated value $\theta_i^{cal}$(l, nT) temporally changes for each l even while no vibration is applied to the optical fiber.

Figure 4:
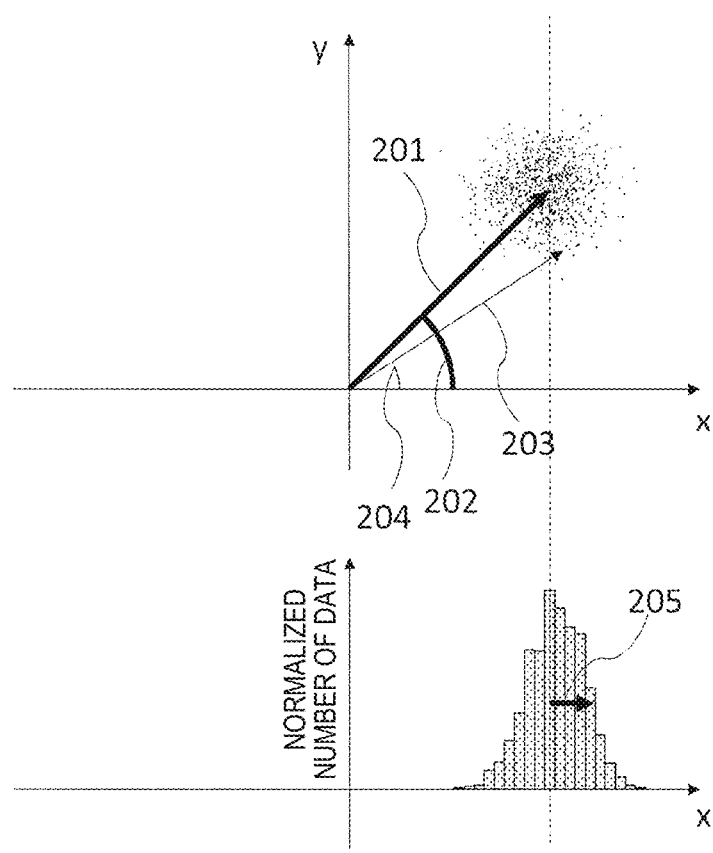
FIG. 4 is a diagram for description of uncertainty of a position pointed by a vector due to noise.

FIG. 4 is a diagram illustrating this situation. When plotted on the xy plane, a vector ($I_i^{measure}$($l_0$, nT), $Q_i^{measure}$ ($l_0$, nT)) at a position $l_0$ is constant at (x, y)=($I_i$(l, nT), $Q_i$(l, nT)) indicated by a vector 201 in a case in which there are no noises, and an angle 202 thereof does not temporally change. However, since noises exist in reality, the vector constituted by the in-phase component and the orthogonal component at each time like a vector 203 is different from the vector 201, and an angle 204 thereof is different from the angle 202. Thus, the vector constituted by the actual measured values has variance with a center at the vector 201. The degree of the variance can be evaluated by using standard deviation of the measured value in each axial direction. For example, in the x axial direction, there is uncertainty of the standard deviation $\sigma(N_I)$ of the noise $N_I$, which is indicated by reference sign 205, based on variance of the measured-value x component.

In a case of coherent detection, the intensity of the reference light is sufficiently large, and thus shot noise is dominant, and noise distribution can be approximated by normal distribution. In addition, since it can be regarded that the intensities of light incident on the two balance detectors 13 and 14 in FIG. 1 are equivalent to each other, it can be regarded that the standard deviations of the noises $N_I$ and $N_Q$ have the same magnitude, and the uncertainty has a circular shape centered at the vector 201.

For example, in a case of a device configuration that performs direct detection instead of coherent detection and for which a noise, such as PD heat noise, other than shot noise of the reference light cannot be ignored, it can be regarded that the two balance detectors 13 and 14 have the same noise characteristic, and thus it can be thought that the uncertainty has a circular shape centered at the vector 201.

However, in such a device configuration that performs direct detection, the degree of the uncertainty is different at each place, depending on the scattered light intensity, for example, when shot noise of scattered light needs to be considered, but noise of the measuring device following an electric stage, such as PD heat noise, is dominant in the uncertainty at a point where the scattered light intensity is small, and thus influence of a fading phenomenon described below exists for the device configuration that performs direct detection.

The scattered light intensity decreases at places due to the fading phenomenon. The uncertainty in phase calculation increases at such a place, and it is difficult to detect small vibration. In particular, when the amplitude of scattered light when there is no noise is small as indicated by a vector 206 in FIG. 5 so that the SN ratio is smaller than one, the probability that a measured vector has, as indicated by a vector 207, a value largely different from the value of the vector 206 when there is no noise increases, which leads to false sensing of vibration. For this reason, when the subsequent unwrapping processing expressed by Expression (3) is performed, the probability that the integer q is wrongly selected increases, which leads to false sensing that particularly large vibration is applied.

It is known that distribution D(P) of variance of scattered light intensity P due to fading when experiment is performed with a single wavelength satisfies an equation below when <P> represents the average value of the scattered light intensity.

[Math. 7]

$$D(P) \propto \exp\left[-\frac{P}{<P>}\right] \quad (7)$$

As indicated by the expression, the distribution D(P) of variance of the scattered light intensity P is larger as the scattered light intensity P is smaller. Thus, when the number of points where the scattered light intensity is small is reduced by increasing the intensity of a pulse of a single wavelength, an extremely large peak intensity is needed, and thus there is limitation in terms of pulse distortion such as a non-linear effect.

Thus, as described below, the signal processing unit 17d performs phase calculation by using the in-phase component $I_i^{measure}$ and the orthogonal component $Q_i^{measure}$ at N different frequencies for i=1, 2, . . . , N, thereby preventing increase of phase uncertainty at a point where the scattered light intensity is small due to fading.

[Measurement Procedure S01]

The in-phase component and the orthogonal component of scattered light generated at the wavelength-multiplexed light pulse 4 incident on the measurement target optical fiber 6 is measured by using a measurement system described with reference to FIG. 1.

[Vector Acquisition Procedure S02]

The two-dimensional vector constituted by the in-phase component and the orthogonal component of the scattered light measured through the measurement procedure S01 at an arbitrary time and an arbitrary position in the measurement target optical fiber 6 is acquired for each wavelength multiplexed in the light pulse 4.

[The Vector Rotation Procedure S03]

First, the phase $\theta_i^{cal}(l, 0)$ is calculated from the measured-value vector $(I_i^{measure}(l, 0), Q_i^{measure}(l, 0))$ at time zero. Subsequently, the vector $(I_i^{measure}(l, nT), Q_i^{measure}(l, nT))$ at each time is rotated by a rotational amount in a direction opposite to that of the calculated phase value $\theta_i^{cal}(l, 0)$, thereby calculating a new vector at each time and each place as in Expression (8).

[Math. 8]

$$\begin{pmatrix} I_i^{new}(l, nT) \\ Q_i^{new}(l, nT) \end{pmatrix} = \begin{pmatrix} \cos(\theta_i^{cal}(l, 0)) & \sin(\theta_i^{cal}(l, 0)) \\ -\sin(\theta_i^{cal}(l, 0)) & \cos(\theta_i^{cal}(l, 0)) \end{pmatrix} \begin{pmatrix} I_i^{measure}(l, nT) \\ Q_i^{measure}(l, nT) \end{pmatrix} \quad (8)$$

[Calculation Procedure S04]

Then, the arithmetic average of the newly calculated vector for each wavelength is calculated as in Expression (9), thereby calculating a vector directly used in phase calculation.

[Math. 9]

$$\begin{pmatrix} I^{new}(l, nT) \\ Q^{new}(l, nT) \end{pmatrix} = \frac{1}{N} \sum_{i=1}^{N} \begin{pmatrix} I_i^{new}(l, nT) \\ Q_i^{new}(l, nT) \end{pmatrix} \quad (9)$$

Lastly, a phase $\theta^{cal}(l, nT)$ is calculated from the vector $(I^{new}(l, nT), Q^{new}(l, nT))$ as in Expression (10).

[Math. 10]

$$\theta^{cal}(l, nT) = \text{Arctan}\left(\frac{Q^{new}(l, nT)}{I^{new}(l, nT)}\right) \quad (10)$$

It is possible to reduce the number of places where the scattered light intensity decreases due to fading by calculating $\theta^{cal}(l, nT)$ by using the vector $(I^{new}(l, nT), Q^{new}(l, nT))$. The principle thereof will be described below.

Figure 6:
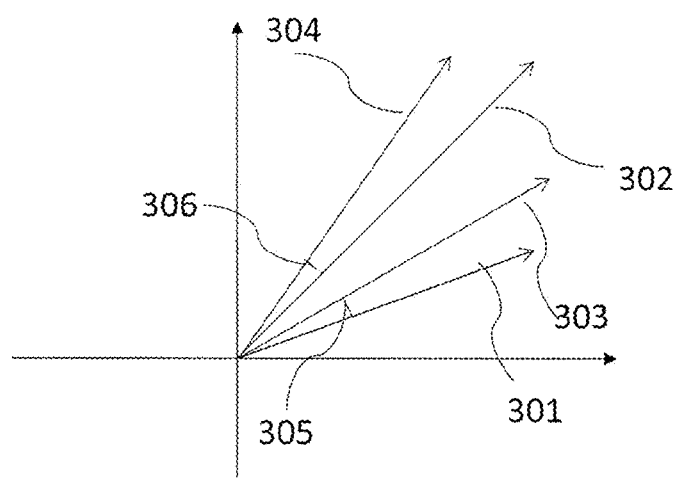
FIG. 6 is a diagram for description of the principle of the phase measurement method according to the present invention.

The values of $\theta^{cal}(l, nT)$ at N different frequencies for i=1, 2, ..., N are different from one another. For example, in a case of N=2, the vectors $(I_i(l, 0), Q_i(l, 0))$ for i=1 and i=2 at time zero when there are no noises have different directions and magnitudes like a vector 301 and a vector 302 in FIG. 6. When the net expansion and contraction amount of the fiber at a place closer than a place at a distance l from an incident end at time nT changes from that at time zero due to vibration, the vectors $(I_i(l, nT), Q_i(l, nT))$ for i=1 and i=2 at time nT change like a vector 303 and a vector 304 in FIG. 6 respectively. The lengths of the vector 303 and the vector 304 change from those of the vector 301 and the vector 302, respectively, and the amount of the change is different between i=1 and i=2, but the directions of the vector 303 and the vector 304 change by the same amount from those of the vector 301 and the vector 302, respectively.

Figure 7:
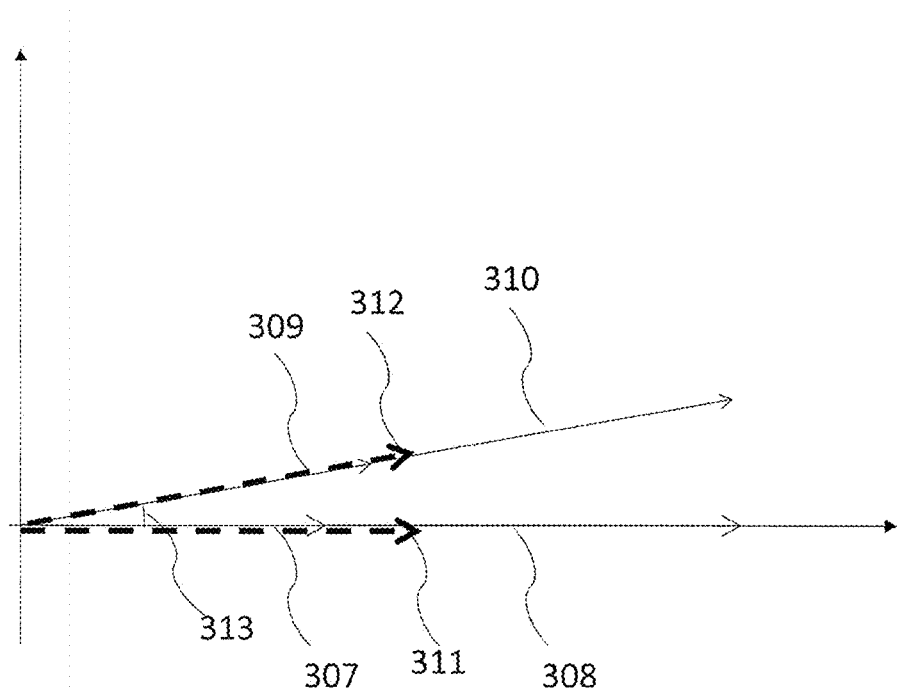
FIG. 7 is a diagram for description of the principle of the phase measurement method according to the present invention.

Thus, an angle 305 and an angle 306 are equal to each other, and this amount corresponds to $\theta(l, nT)$ in Expression (1). When there are no noises, the vector 301, the vector 302, the vector 303, and the vector 304 are transitioned to a vector 307, a vector 308, a vector 309, and a vector 310, respectively, as illustrated in FIG. 7 by Expression (8). In this manner, the directions of vectors of all wavelengths are aligned for each time.

A vector 311 $(I^{new}(l, 0), Q^{new}(l, 0))$ is obtained as the average of the vector 307 and the vector 308, and a vector 312 $(I^{new}(l, nT), Q^{new}(l, nT))$ is obtained as the average of the vector 309 and the vector 310. The change amount of the phase from time 0 to nT is an angle 313, which is equal to the angle 305 and the angle 306.

In actual measurement, uncertainty due to noises exists in the directions of the vector 301, the vector 302, the vector 303, the vector 304, the vector 311, and the vector 312, and as a result, the angle 305 and the angle 306 have uncertainty. However, it is possible to reduce uncertainty by calculating the angle 313 by using the vector 311 and the vector 312 obtained through arithmetic averaging. There are two reasons for this.

Figure 8:
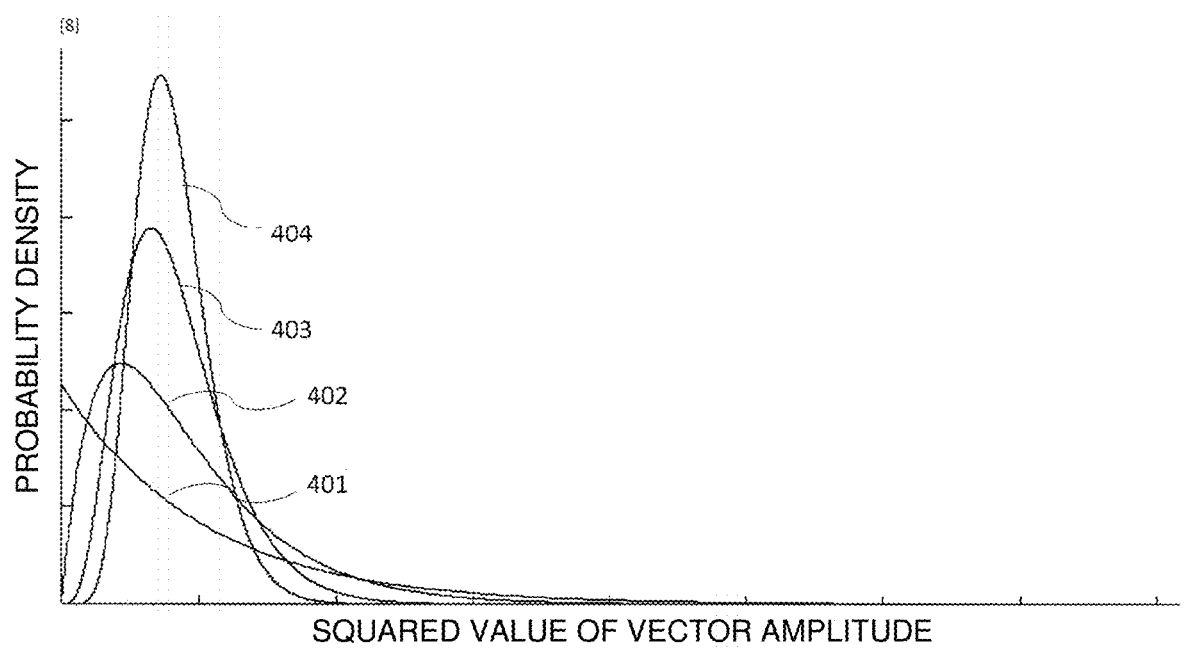
FIG. 8 is a diagram for description of an effect of the phase measurement method according to the present invention.

One reason is because intensity probability distribution corresponding to the squared amplitude of each of the vector 307 and the vector 308 independently obeys Expression (7). Thus, intensity probability distribution corresponding to the squared amplitude of the vector 311 is theoretically distribution 402 in FIG. 8, and it is possible to remove a point where the scattered light intensity significantly decreases due to fading in a case of a single wavelength, with the same average value. For comparison, FIG. 8 illustrates, as distribution 401, probability distribution in a case of one wavelength.

The other reason is because, through averaging of the vector 307 and the vector 308, the vector 311 obtains a noise level equal to $1/\sqrt{2}$ of those of the vector 301 and the vector 302. Thus, although the average value of the length of the vector 311 is same as those of the vector 301 and the vector 302, it is possible to decrease uncertainty in phase calculation through the decrease of the noise level. This is same for the vector 312.

The effect of the present disclosure is specifically described above for the case of N frequencies where N is two, but generalization thereof is possible. The number of places where the scattered light intensity is close to zero decreases for a larger multiplex number N. This situation in a case of N=5 is indicated as distribution 403, and the situation in a case of N=10 is indicated as distribution 404. In addition, the magnitude of the noise level is $1/\sqrt{N}$ times larger, and thus uncertainty in phase calculation decreases for a larger N with the same average intensity.

The signal processing method described in the present embodiment is different from a method of simply averaging $\theta_i^{cal}(l, nT)$ over different values of i, for example, a method of calculating the average of a phase 305 and a phase 306 in a case of N=2. In the method of simply averaging $\theta_i^{cal}(l, nT)$ over differently values of i, since $\theta_i^{cal}(l, nT)$ is calculated for a single wavelength, the measured value is largely different at a place where the scattered light intensity is small due to fading as compared to a case in which there are no noises. Thus, the occurrences of vibration false sensing cannot be reduced. Although it is possible to reduce, through phase averaging, the difference between an ideal phase value when there are no noises and the measured value, the occurrence frequency of the difference increases because a place where the scattered light intensity decreases is different for each wavelength. Thus, a point where the scattered light intensity decreases due to fading cannot be removed by simply averaging $\theta_i^{cal}(l, nT)$ over different values of i.

Although the right hand side of Expression (9) includes multiplication by 1/N for description, the phase value calculated by Expression (10) is same without the multiplication, and thus the multiplication by 1/N may be omitted in actual calculation.

Embodiment 2

Embodiment 1 describes an example in which the rotation angle of the vector rotation of Expression (8) is $\theta_i^{cal}(l, 0)$ at time zero. An in-phase component and an orthogonal component used to calculate $\theta_i^{cal}(1, 0)$ are $(I_i^{measure}(1, 0), Q_i^{measure}(1, 0))$ constituting a vector including noise influence. Thus, $\theta_i^{cal}(1, 0)$ includes noise influence. The effect of the vector rotation of Expression (8) is potentially not obtained in a case in which, at time zero, the value of $\theta_i^{cal}(1, 0)$ is largely different from the value of $\theta i(1, 0)$ when there are no noises.

Figure 5:
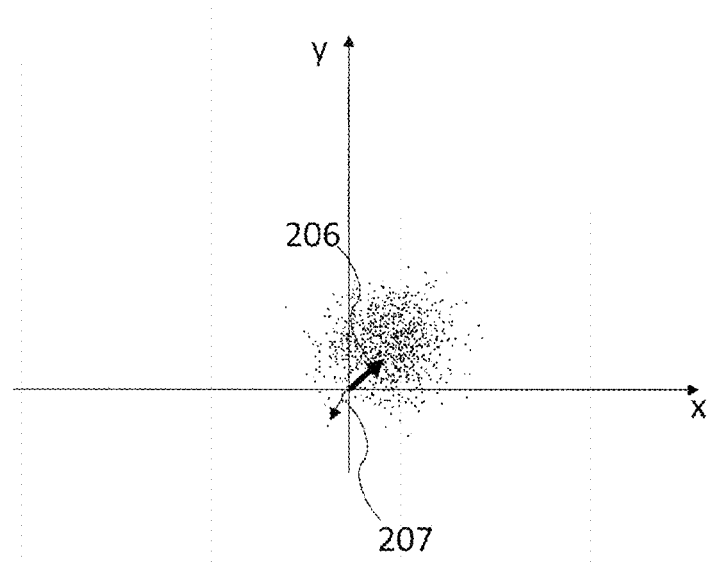
FIG. 5 is a diagram for description of vector difference due to the existence of noises.

Description is made with reference to FIG. 5. For example, at a place in the fiber longitudinal direction and at a frequency, the vector of scattered light at time zero, which is the vector 206 when there are no noises, is the vector 207 due to noises. Calculation that performs vector rotation by Expression (8) and then vector arithmetic averaging by Expression (9) has an effect of reducing the number of points (points affected by fading) where the vector length is close to zero. However, in this example, the rotation angle at the frequency is determined with reference to the angle of the vector 207, and thus the effect cannot be obtained for the frequency.

In addition, an error in the rotation angle also leads to a case in which the magnitude of measured vibration cannot be correctly evaluated. This case is described with reference to FIG. 6. For example, when the vectors 301 and 303 (wavelength 1) and the vectors 302 and 304 (wavelength 2) are vectors not affected by noises, a rotation angle that aligns vectors having different wavelengths is not zero. However, when the directions of a vector of wavelength 1 and a vector of wavelength 2 are incidentally identical to each other due to the influence of noises at time zero as a reference, the vector of wavelength 2 at zero rotation angle, in other words, with no rotation is subjected to arithmetic averaging with the vector of wavelength 1 in the method of Embodiment 1. Specifically, the average vector at time zero is a vector obtained through arithmetic averaging of the vectors 301 and the vector 302 (no rotation), and the average vector at time nT is a vector obtained through arithmetic averaging the vectors 303 and the vector 304 (no rotation). Thus, average-vector angle change from time zero to time nT does not match angle change from the vector 301 to the vector 303 nor angle change from the vector 302 to the vector 304, and phase change cannot be correctly determined.

Figure 9:
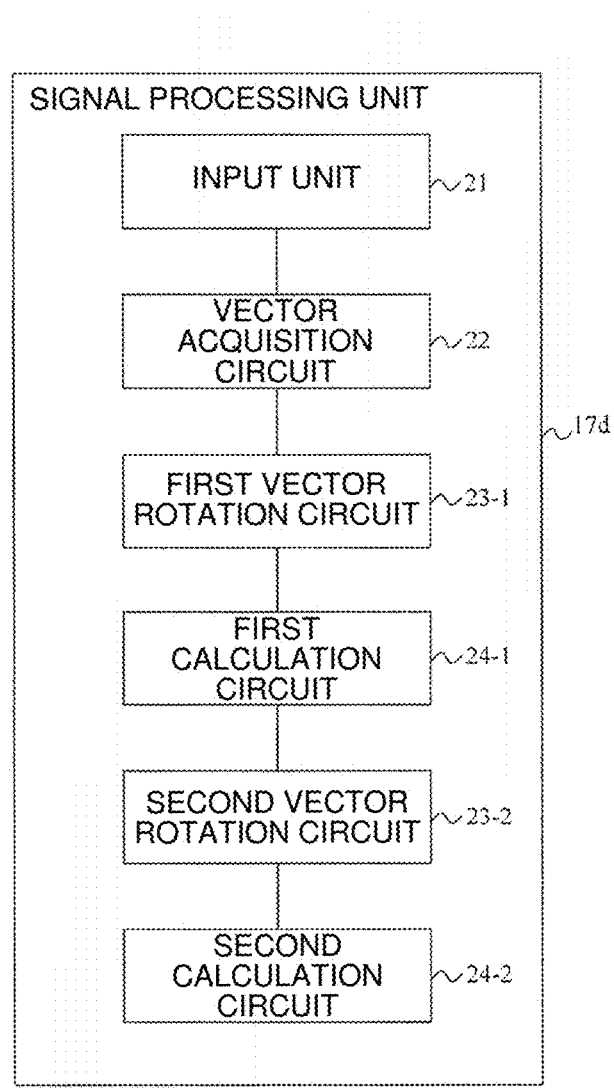
FIG. 9 is a diagram for description of the structure of the signal processing device according to the present invention.

The present embodiment describes a method of reducing the occurrence frequency of failure as described above. FIG. 9 is a diagram for description of the structure of the signal processing unit 17d of a vibration detection device of the present embodiment. The signal processing unit 17d of the present embodiment includes the input unit 21, the vector acquisition circuit 22, a first vector rotation circuit 23-1, a first calculation circuit 24-1, a second vector rotation circuit 23-2, and a second calculation circuit 24-2.

An in-phase component and an orthogonal component of scattered light generated at a wavelength-multiplexed light pulse incident on a measurement target optical fiber are input to the input unit 21, the in-phase component and the orthogonal component being measured by a measuring device.

The vector acquisition circuit 22 acquires, for each wavelength multiplexed in the light pulse, a two-dimensional vector constituted by the in-phase component and the orthogonal component of the scattered light input to the input unit 21 at an arbitrary time and an arbitrary position in the measurement target optical fiber 6.

The first vector rotation circuit 23-1 rotates the two-dimensional vector acquired by the vector acquisition circuit 22 for a reference wavelength at each time by a reference rotational amount for the time so that the two-dimensional vector points in a reference direction. In addition, the first vector rotation circuit 23-1 rotates the two-dimensional vector acquired by the vector acquisition circuit 22 for another wavelength different from the reference wavelength at each time by a reference rotational amount for the time.

The first calculation circuit 24-1 calculates a first synthesis reference vector as the arithmetic average of the two-dimensional vector for the reference wavelength at each time, which is rotated by the first vector rotation circuit 23-1. In addition, the first calculation circuit 24-1 calculates a first synthesis vector for each wavelength as the arithmetic average of the two-dimensional vector for the other wavelength at each time, which is rotated by the first vector rotation circuit 23-1. In addition, the first calculation circuit 24-1 calculates a reference rotational amount for each wavelength based on an angle between the first synthesis reference vector and the first synthesis vector.

The second vector rotation circuit 23-2 rotates the two-dimensional vector acquired by the vector acquisition circuit 22 for each wavelength at a reference time by a reference rotational amount for the wavelength, which is calculated by the first calculation circuit 24-1. In addition, the second vector rotation circuit 23-2 rotates the two-dimensional vector acquired by the vector acquisition circuit 22 for each wavelength at another time different from the reference time by a reference rotational amount for the wavelength, which is calculated by the first calculation circuit 24-1.

The second calculation circuit 24-2 calculates a second synthesis reference vector as the arithmetic average of the two-dimensional vector for each wavelength at the reference time, which is rotated by the second vector rotation circuit 23-2. In addition, the second calculation circuit 24-2 calculates a second synthesis vector as the arithmetic average of the two-dimensional vector for each wavelength at the other time, which is rotated by the second vector rotation circuit 23-2. In addition, the second calculation circuit 24-2 calculates a phase change amount of the scattered light based on an angle between the second synthesis reference vector and the second synthesis vector.

Figure 10:
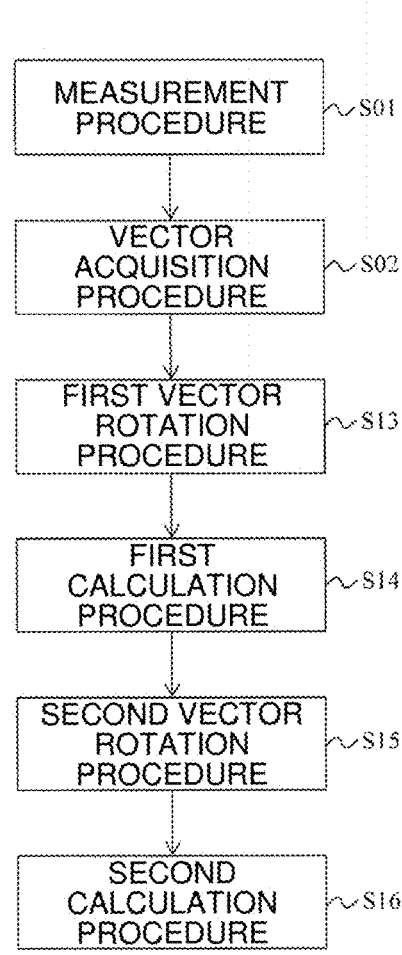
FIG. 10 is a diagram for description of the phase measurement method according to the present invention.

FIG. 10 is a diagram for description of a phase measurement method performed by the present vibration detection device. The phase measurement method includes six steps described below.

In the measurement procedure S01 as the first step, an in-phase component and an orthogonal component of scattered light generated at a wavelength-multiplexed light pulse incident on a measurement target optical fiber are measured.

In the vector acquisition procedure S02 as the second step, a two-dimensional vector constituted by the in-phase component and the orthogonal component of the scattered light measured through the measurement procedure S01 at an arbitrary time and an arbitrary position in the measurement target optical fiber is acquired for each wavelength multiplexed in the light pulse.

In a first vector rotation procedure S13 as the third step, the two-dimensional vector acquired through the vector acquisition procedure S02 for a reference wavelength at each time is rotated by a reference rotational amount for the time so that the two-dimensional vector points in a reference direction. In addition, in the first vector rotation procedure S13, the two-dimensional vector acquired through the vector acquisition procedure S02 for another wavelength different from the reference wavelength at each time is rotated by a reference rotational amount for the time.

In a first calculation procedure S14 as the fourth step, the first synthesis reference vector is calculated as the arithmetic average of the two-dimensional vector for the reference wavelength at each time, which is rotated through the first vector rotation procedure S13.

In addition, in the first calculation procedure S14, the arithmetic average of the two-dimensional vector for the other wavelength at each time, which is rotated through the first vector rotation procedure S13 is calculated as the first synthesis vector for the wavelength. In addition, in the first calculation procedure S14, a reference rotational amount for each wavelength is calculated based on an angle between the first synthesis reference vector and the first synthesis vector. In a second vector rotation procedure S15 as the fifth step, the two-dimensional vector acquired through the vector acquisition procedure S02 for each wavelength at a reference time is rotated by the reference rotational amount for the wavelength, which is calculated through the first calculation procedure S14. In addition, in the second vector rotation procedure S15, the two-dimensional vector acquired through the vector acquisition procedure S02 for each wavelength at another time different from the reference time is rotated by the reference rotational amount for the wavelength, which is calculated through the first calculation procedure S14.

In a second calculation procedure S16 as the sixth step, the arithmetic average of the two-dimensional vector for each wavelength at the reference time, which is rotated through the second vector rotation procedure S15 is calculated as the second synthesis reference vector. In addition, in the second calculation procedure S16, the arithmetic average of the two-dimensional vector for each wavelength at the other time, which is rotated through the second vector rotation procedure S15 is calculated as the second synthesis vector. In addition, in the second calculation procedure S16, a phase change amount of the scattered light is calculated based on an angle between the second synthesis reference vector and the second synthesis vector.

The input unit 21, the vector acquisition circuit 22, the measurement procedure S01, and the vector acquisition procedure S02 are same as described in Embodiment 1. First, the first vector rotation circuit 23-1 performs the first vector rotation procedure S13 below.

An expression below is calculated for all values of i with i=1 as a reference (reference wavelength).

[Math. 11]

$$r'_i(l, nT) = \begin{pmatrix} I'_i(l, nT) \\ Q'_i(l, nT) \end{pmatrix} = \begin{pmatrix} \cos(\theta_1^{cal}(l, nT)) & \sin(\theta_1^{cal}(l, nT)) \\ -\sin(\theta_1^{cal}(l, nT)) & \cos(\theta_1^{cal}(l, nT)) \end{pmatrix} \begin{pmatrix} I_i^{measure}(l, nT) \\ Q_i^{measure}(l, nT) \end{pmatrix} \quad (11)$$

Subsequently, a first calculation circuit 23-1 performs the first calculation procedure S14 below. The arithmetic average of r'(l, nT) obtained by Expression (11) is calculated for all times by an expression below.

[Math. 12]

$$r''_i(l) = \begin{pmatrix} I''_i(l) \\ Q''_i(l) \end{pmatrix} = \frac{1}{M} \sum_{n=1}^{M} r'_i(l, nT) \quad (12)$$

In the expression, M represents the number of samples in the time direction. An expression below is calculated by using $r_i''(l)$ obtained by Expression (12)

[Math. 13]

$$\theta'_i(l) = \text{Arctan}\left[\frac{Q''_i(l)}{I''_i(l)}\right] \quad (13)$$

Simple description is given below.

First, the vector at each time is rotated for the reference wavelength i=1 so that the vector points along an I axis. This rotation angle is represented by $\theta_{i=1}(t)$. The angle $\theta_{i=1}(t)$ changes with time. The vector after the rotation is represented by At.

Subsequently, the vector at each time is rotated by $\theta_{i=1}(t)$ for another wavelength. The vector for each wavelength after the rotation is represented by $Bt_i$.

Subsequently, the vectors after the rotation are averaged in time for each wavelength. The vector for the reference wavelength after the time average is represented by ΣAt. The vector for the other wavelength after the time average is represented by $\Sigma Bt_i$.

Then, the angle between ΣAt and $\Sigma Bt_i$ is calculated. This angle is θI'(l) in Expression (13). The angle θI'(l) exists for each other wavelength.

The second vector rotation procedure S15 performed by the second vector rotation circuit 23-2 and the second calculation procedure S16 performed by the second calculation circuit 24-2 are same as the vector rotation procedure S03 and the calculation procedure S04, respectively, described in Embodiment 1 except for points described below. In calculation of Expression (8), the vector ($I^{new}$(l, nT), $Q^{new}$(l, nT)) is calculated by using θI'(l) in Expression (13) in place of $\theta_i^{cal}$(l, 0), and phase calculation is performed by Expression (9).

Significance of the present method is described below. When vibration occurs, the angle between vectors of different frequencies does not change in a case in which there are no noises. In an example of two frequencies, without noise influence, the angle between the vectors 301 and the vector 302 at a reference time is equal to the angle between the vectors 303 and the vector 304 at time nT after. Thus, the vector rotation by Expression (11) is performed and then the vector arithmetic averaging by Expression (12) is performed to obtain a rotation angle θI'(l) as the angle between the arithmetic average vector at the reference time and the arithmetic average vector at time nT after. Accordingly, the magnitude of noise included in each vector can be reduced to $1/\sqrt{M}$. Thus, noise influence can be reduced by setting a sufficiently large M.

The method of the present embodiment is different from a method (hereinafter referred to as a comparative method) of calculating a rotation angle by calculating the phase difference between vectors of different frequencies for each time and then averaging the phase difference between for all times. The method of the present embodiment is different in that vectors of all wavelengths are rotated by a rotation angle of wavelength 1 in advance. For example, when the number of frequencies is two, the comparative method simply calculates the angle difference between the vectors 302 and the vector 301 and the angle difference between the vectors 303 and the vector 302 and calculates a rotation angle as the average value thereof. With the comparative method, the effect of the rotation by Expression (8) is insufficient because the occurrence probability of a point (measurement position in the measurement target fiber) where the calculated value of the phase difference at each time is largely different from that when there are no noises does not change.

Although the right hand side of Expression (12) includes multiplication by 1/M for description, the rotation angle calculated by Expression (13) is same without the multiplication, and thus the multiplication by 1/M may be omitted in actual calculation.

The method of Embodiment 2 has an increased calculation time but has reduced uncertainty in definitive phase calculation as compared to the method of Embodiment 1.

The present invention is not limited to the above-described embodiments but may be materialized by components modified without departing from the scope thereof when performed.

[Notes]

The signal processing method of the present embodiment is described below.

(1): In a device configuration that includes a phase OTDR device configured to measure the phase of scattered light scattered from a measurement target optical fiber and in which incident light in the device is wavelength-multiplexed, the present signal processing method produces a scattered light vector obtained by plotting scattered light at each wavelength onto a two-dimensional plane having the in-phase component thereof as the horizontal axis and the orthogonal component thereof as the vertical axis, rotates the produced scattered light vector for each wavelength at each place in the measurement target optical fiber to align the directions of the vectors, calculates the arithmetic average of the vectors having the aligned directions to generate a new vector, and calculates a phase by using the values of the in-phase component and the orthogonal component of the generated new vector, thereby performing highly sensitive phase measurement.

(2): In the procedure of rotating, for each wavelength, the scattered light vector at each place in the measurement target optical fiber, the signal processing method described above in (I) calculates the rotational amount for each wavelength based on a vector generated by rotating the scattered light vector at each place and each time to align the directions of the vectors and calculating the arithmetic average of the vectors having the aligned directions.

(3): A measurement device that uses the above-described signal processing method includes a laser beam source configured to output continuous light and four elements described below and performs the above-described signal processing method by using output in-phase and orthogonal components.

The first element is an element configured to bifurcate the continuous light from the laser beam source into reference light and probe light. The second element is an element configured to multiplex the frequency of the probe light. The third element is an element configured to cause the probe light to be incident on a measurement target optical fiber. The fourth element is an element configured to receive backscattered light of the probe light from the measurement target optical fiber and the reference light and output the in-phase and orthogonal components of the backscattered light.

INDUSTRIAL APPLICABILITY

The present invention is applicable to a vibration detection device that employs DAS-P.

The vibration detection device can accurately measure vibration and thus can accurately perform structure state recognition in structure sensing, intrusion determination in intruder sensing, and the like.

REFERENCE SIGNS LIST 1 light source
2 coupler
3 light modulator
4 light pulse
4a minute pulse
5 circulator
6 measurement target optical fiber
7 90-degree optical hybrid
8, 9 coupler
10 phase shifter
11, 12 coupler
13, 14 balance detector
15 analog in-phase component electric signal
16 analog orthogonal component electric signal
17 signal processing device
17a, 17b AD conversion element
17c, 17d signal processing unit
21 input unit
22 vector acquisition circuit
23 vector rotation circuit
24 calculation circuit
23-1 first vector rotation circuit
23-2 second vector rotation circuit
24-1 first calculation circuit
24-2 second calculation circuit
31 measuring device

The invention claimed is:

1. A phase measurement method comprising:
measuring an in-phase component and an orthogonal component of scattered light generated at a wavelength-multiplexed light pulse incident on a measurement target optical fiber;
acquiring, for each wavelength multiplexed in the light pulse, a two-dimensional vector constituted by the in-phase component and the orthogonal component of the scattered light at an arbitrary time and an arbitrary position in the measurement target optical fiber;
rotating the two-dimensional vector of each wavelength at a reference time by a reference rotational amount for the wavelength so that the two-dimensional vector points in a reference direction and the two-dimensional vector of each wavelength at another time which is different from the reference time by the reference rotational amount for the wavelength; and
calculating a synthesis reference vector as an arithmetic average of the two-dimensional vector of each wavelength at the reference time, a synthesis vector as an arithmetic average of the two-dimensional vector of each wavelength at the other time, and a phase change amount of the scattered light based on an angle between the synthesis reference vector and the synthesis vector.

2. A phase measurement method comprising:
measuring an in-phase component and an orthogonal component of scattered light generated at a wavelength-multiplexed light pulse incident on a measurement target optical fiber;
acquiring, for each wavelength multiplexed in the light pulse, two-dimensional vector constituted by the in-phase component and the orthogonal component of the scattered light at an arbitrary time and an arbitrary position in the measurement target optical fiber;

rotating the two-dimensional vector of a reference wavelength at each time by a reference rotational amount for the time so that the two-dimensional vector points in a reference direction and the two-dimensional vector of another wavelength which is different from the reference wavelength at each time by the reference rotational amount for the time;

calculating a first synthesis reference vector as an arithmetic average of the two-dimensional vector for the reference wavelength at each time, a first synthesis vector of each wavelength as an arithmetic average of the two-dimensional vector of the other wavelength at each time and a reference rotational amount of each wavelength based on an angle between the first synthesis reference vector and the first synthesis vector;

rotating the two-dimensional vector of each wavelength at a reference time by the reference rotational amount of the wavelength and the two-dimensional vector of each wavelength at another time which is different from the reference time by the reference rotational amount for the wavelength; and calculating a second synthesis reference vector as an arithmetic average of the two-dimensional vector of each wavelength at the reference time, a second synthesis vector as an arithmetic average of the two-dimensional vector of each wavelength at the other time and a phase change amount of the scattered light based on an angle between the second synthesis reference vector and the second synthesis vector.

3. A signal processing device comprising:

an input unit to which an in-phase component and an orthogonal component of scattered light generated at a wavelength-multiplexed light pulse incident on a measurement target optical fiber are input, the in-phase component and the orthogonal component being measured by a measuring device;

a vector acquisition circuit which acquires, for each wavelength multiplexed in the light pulse, a two-dimensional vector constituted by the in-phase component and the orthogonal component of the scattered light at an arbitrary time and an arbitrary position in the measurement target optical fiber;

a vector rotation circuit which rotates the two-dimensional vector of each wavelength at a reference time by a reference rotational amount for the wavelength so that the two-dimensional vector points in a reference direction and the two-dimensional vector of each wavelength at another time which is different from the reference time by the reference rotational amount for the wavelength; and a calculation circuit calculates a synthesis reference vector as an arithmetic average of the two-dimensional vector of each wavelength at the reference time, a synthesis vector as an arithmetic average of the two-dimensional vector for each wavelength at the other time and a phase change amount of the scattered light based on an angle between the synthesis reference vector and the synthesis vector.

4. A signal processing device comprising:

an input unit to which an in-phase component and an orthogonal component of scattered light generated at a wavelength-multiplexed light pulse incident on a measurement target optical fiber are input, the in-phase component and the orthogonal component being measured by a measuring device;

a vector acquisition circuit which acquires, for each wavelength multiplexed in the light pulse, a two-dimensional vector constituted by the in-phase component and the orthogonal component of the scattered light at an arbitrary time and an arbitrary position in the measurement target optical fiber;

a first vector rotation circuit which rotates the two-dimensional vector of a reference wavelength at each time by a reference rotational amount for the time so that the two-dimensional vector points in a reference direction and the two-dimensional vector of another wavelength which is different from the reference wavelength at each time by the reference rotational amount for the time;

a first calculation circuit which calculates a first synthesis reference vector as an arithmetic average of the two-dimensional vector for the reference wavelength at each time, a first synthesis vector of each wavelength as an arithmetic average of the two-dimensional vector of the other wavelength at each time and a reference rotational amount of each wavelength based on an angle between the first synthesis reference vector and the first synthesis vector;

a second vector rotation circuit which rotates the two-dimensional vector of each wavelength at a reference time by the reference rotational amount of the wavelength and the two-dimensional vector of each wavelength at another time which is different from the reference time by the reference rotational amount for the wavelength; and a second calculation circuit which calculates a second synthesis reference vector as an arithmetic average of the two-dimensional vector of each wavelength at the reference time, a second synthesis vector as an arithmetic average of the two-dimensional vector of each wavelength at the other time and a phase change amount of the scattered light based on an angle between the second synthesis reference vector and the second synthesis vector.

* * * * *